United States Patent [19]

Fisher et al.

[11] Patent Number: 4,484,944
[45] Date of Patent: Nov. 27, 1984

[54] REDUCTION OF IRON ORES BY HYDROCARBONS

[76] Inventors: Charles B. Fisher, 2850 Hill Park Rd., Montreal, Quebec, Canada, H3H 1T1; Sidney T. Fisher, 53 Morrison Ave., Montreal, Quebec, Canada, H3R 1K3

[21] Appl. No.: 545,849

[22] Filed: Oct. 27, 1983

[51] Int. Cl.³ .............................................. C21B 13/08
[52] U.S. Cl. ......................................... 75/1 R; 75/35; 75/40
[58] Field of Search .................. 75/26, 91, 34, 35, 40, 75/1 R

[56] References Cited

U.S. PATENT DOCUMENTS

| | | | |
|---|---|---|---|
| 1,167,016 | 1/1916 | Pratt | 75/40 |
| 1,422,733 | 7/1922 | Bradley | 75/40 |
| 2,988,442 | 6/1961 | Tanner | 75/34 |
| 2,991,172 | 7/1961 | Hahn | 75/26 |
| 3,282,677 | 11/1966 | Futakuchi et al. | 75/34 |

Primary Examiner—M. J. Andrews

[57] ABSTRACT

The iron ores hematite, magnetite, limonite and siderite are reduced to iron by chemical reactions of the oxides in the ores with hydrocarbon gases in the absence of oxygen and oxygen compounds except carbon dioxide, in the input to the reaction chamber, other than the iron oxides. With certain ores and hydrocarbons the reactions are exothermic; other reactants require added heat. This method achieves the results of blast furnace techniques with more efficient utilization of fuel, lower cost fuel, lower cost of labor, an improved method of removing silica from the iron ores, and the use of readily available hydrocarbons in place of metallurgical coke which is often scarce.

14 Claims, 7 Drawing Figures

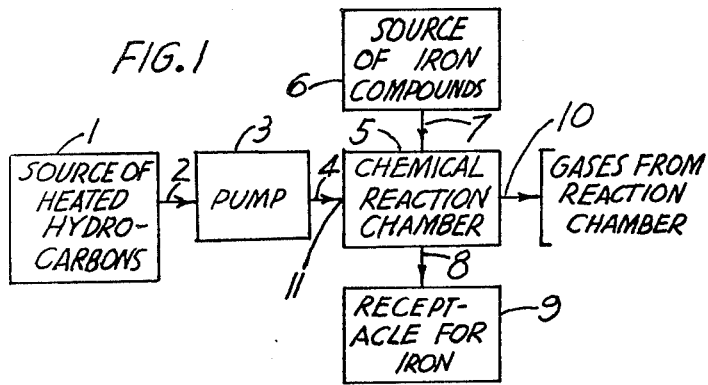
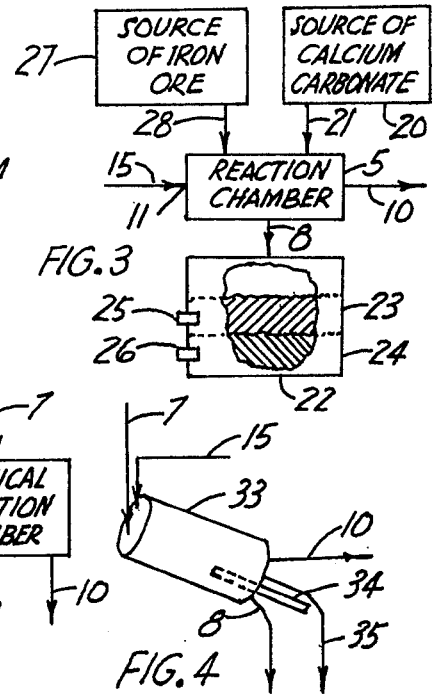
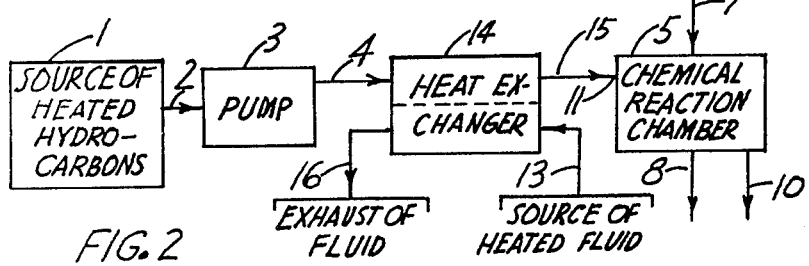
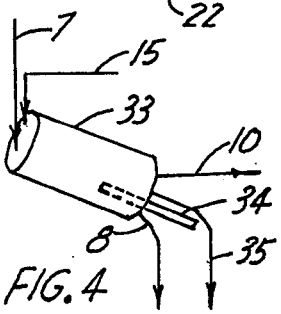
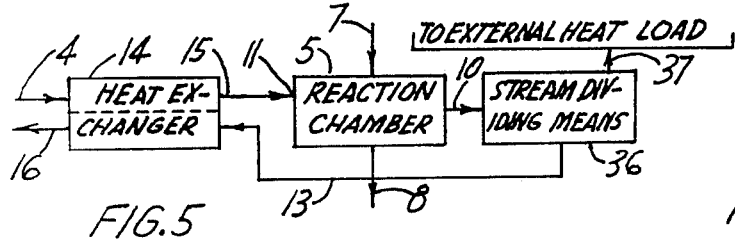
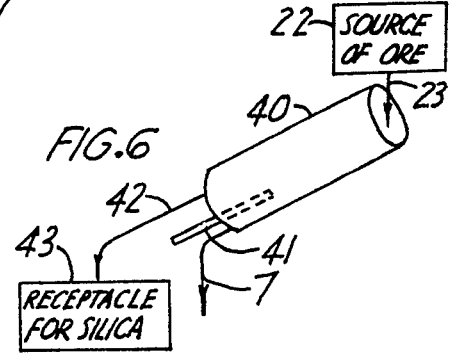
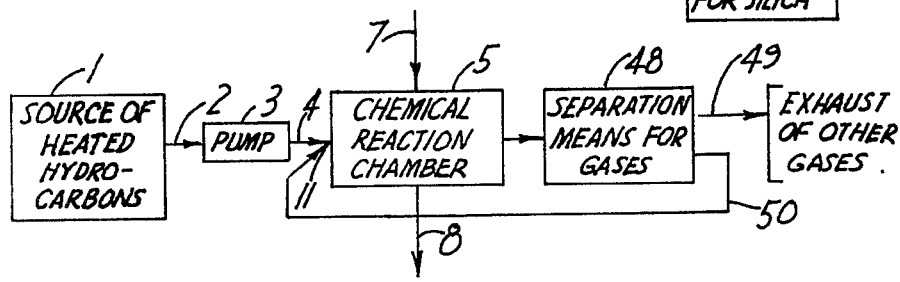

REDUCTION OF IRON ORES BY HYDROCARBONS

BACKGROUND OF THE INVENTION

Methods are disclosed for reducing compounds of iron to iron by reacting the ores with hydrocarbons in the absence of oxygen.

In the prior art iron ores, principally hematite containing $Fe_2O_3$, magnetite containing $Fe_3O_4$, siderite containing $FeCO_3$ and limonite containing $Fe_2O_3.3H_2O$, are reduced in a blast furnace with metallurgical coke as fuel, limestone as a flux and a blast of air. Oxygen in the blast reacts with carbon in the coke to deliver heat and form carbon dioxide. The carbon dioxide reacts with carbon to form carbon monoxide which reduces the iron compounds to iron, and the furnace delivers heated carbon monoxide, carbon dioxide, nitrogen and water vapor. Silica present in the ores reacts with calcium carbonate to form a liquid slag. Iron and slag may be tapped separately from the furnace. The exhaust gas may be used to heat the air blast, to provide heat for other uses and to supply flammable gas. Smelting by direct reduction and by the use of other fuels including hydrocarbons with oxygen added to also known.

In operation, preparation and handling of coke, operation and maintenance of the air blast, and effective utilization of furnace gases require substantial amounts of skilled labor.

Excessive consumption of fuel and high labor costs mean that blast furnace operation is recognized as unsatisfactory. This result arises as a usable form of gaseous carbon does not occur, and the expedient chosen is to use carbon monoxide.

In the invention a furnace is charged with iron ore which is traversed with a rapid current of hydrocarbon gas free from oxygen and compounds containing oxygen, except carbon dioxide. The reaction of some hydrocarbons with iron ores is exothermic, so that additional heat may not be required. In other cases the hydrocarbon is preheated. The cost of fuel, hydrocarbon and labor may be substantially less than an equally productive blast furnace operation.

A usual impurity in iron ores is silica. In the invention the silica and the iron compounds may be separated by mechanical means at relatively low cost, before exposure to the hydrocarbon, because of the substantial difference of density between the iron compounds and silica.

BRIEF SUMMARY OF THE INVENTION

This is a basic method of producing iron from ores using a stream of hydrocarbon gas, heated as necessary before traversing the ore, and free from oxygen and oxygen compounds except carbon dioxide. Some reactions of iron ores with hydrocarbons are exothermic. Heat from the exhaust gases may be used to preheat the hydrocarbon and for other purposes. Uncombined hydrocarbon may be separated from the exhaust gases and recycled over the iron ore.

Silica in the iron ore may be separated from the iron compounds by combination with calcium carbonate to form a liquid slag, or may be removed by low-energy mechanical means before exposure to the hydrocarbon, due to the substantial difference of density between silica and iron compounds.

The objects of the invention include reduction of the cost of fuel, the cost of labor, the capital cost of smelting plant per ton of iron produced and the replacement of metallurgical coal and coke by readily available and readily transportable hydrocarbons.

BRIEF DESCRIPTION OF DRAWINGS

FIG. 1 shows basic means according to the invention for producing iron from iron compounds by passing heated hydrocarbons without oxygen over the compounds.

FIG. 2 shows means according to the invention, in which the hydrocarbons of FIG. 1 are heated by an external source of heat.

FIG. 3 shows means according to the invention, in which iron compounds mixed with silica are combined by heating with calcium carbonate to form a liquid slag.

FIG. 4 shows means according to the invention, in which hydrocarbons and iron compounds are heated to a temperature below the melting point of iron, and iron produced thereby and the iron compounds are separated by mechanical means, due to the differences in density.

FIG. 5 shows means according to the invention, of utilizing a portion of the heat produced by an exothermic reaction between hydrocarbons and iron compounds to heat the hydrocarbons, and a portion of the heat for other purposes.

FIG. 6 shows means according to the invention, for separating mechanically iron compounds mixed with silica, and the silica, due to the difference in density of iron compounds and silica, before the mixture is exposed to hydrocarbons.

FIG. 7 shows means according to the invention for recycling unreacted hydrocarbons for further reaction with iron compounds.

DETAILED DESCRIPTION OF THE INVENTION

The chemical reactions of the invention of two different hydrocarbons with the more important iron ores are as follows:

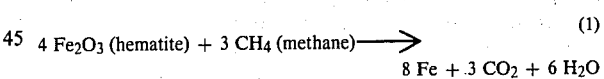

(1) 4 $Fe_2O_3$ (hematite) + 3 $CH_4$ (methane) ⟶ 8 Fe + 3 $CO_2$ + 6 $H_2O$

Reaction (1) requires 330 calories and 0.12 g of methane per gram of iron.

(2) $Fe_3O_4$ (magnetite) + $CH_4$ ⟶ 3 Fe + $CO_2$ + 2 $H_2O$

Reaction (2) requires 323 calories and .096 g of methane per gram of iron.

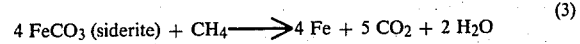

(3) 4 $FeCO_3$ (siderite) + $CH_4$ ⟶ 4 Fe + 5 $CO_2$ + 2 $H_2O$

Reaction (3) requires 573 calories and .072 g of methane per gram of iron.

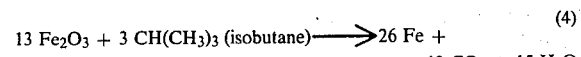

(4) 13 $Fe_2O_3$ + 3 $CH(CH_3)_3$ (isobutane) ⟶ 26 Fe + 12 $CO_2$ + 15 $H_2O$

Reaction (4) requires 341 calories and .12 g of isobutane per gram of iron.

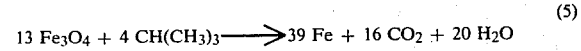

(5) 13 $Fe_3O_4$ + 4 $CH(CH_3)_3$ ⟶ 39 Fe + 16 $CO_2$ + 20 $H_2O$

Reaction (5) requires 361 calories and .11 g of isobutane per gram of iron.

Heat in the stream of exhaust gas from the furnace may be recovered. In a comparison not entirely correct because of slag formation and other factors, a blast furnace requires about 7700 calories per gram of iron produced.

Data for the results given above are from Brown, Modern Chemistry, Columbus 1968, pages 215–216 and 628–630, and the Handbook of Physics and Chemistry, Cleveland 1958, pp. 1858–1897.

The invention depends on a fast stream of heated oxygen-free hydrocarbon gas through iron compounds, so that oxygen atoms escaping from the iron compounds are quickly combined with the hydrocarbon carbon atoms to form carbon dioxide, and with the hydrocarbon hydrogen atoms to form water vapor, thus preventing recombination of the oxygen atoms with iron or iron compounds. Pressure in the reaction chamber, from the pump, above one atmosphere increases the rate of production of iron and reduces entrance of air with ore and flux.

FIG. 1 shows basic means for the method according to the invention of producing iron from iron compounds containing oxygen, by passing a first fast stream of hydrocarbon, with an immaterial proportion of oxygen and oxygen compounds except carbon dioxide, through the iron compounds in a reaction chamber, in which a chemical reaction between the hydrocarbons and the iron ores causes at least a portion of the iron compounds to be reduced to iron. This reaction may be exothermic when the reactants are suitably chosen. Source 1 of hydrocarbons delivers them as a first fast stream over duct 2 to pump 3, and through duct 4 to entrance 11 of reaction chamber 5. Source 6 of the iron compounds delivers them over duct 7 to reaction chamber 5. The iron compounds and the hydrocarbons form iron, which passes by gravity through duct 8 to receptacle 9 for the iron. The second stream of gases from reaction chamber 5, which may include unreacted hydrocarbons, is exhausted through duct 10. When the reaction rate is to be increased ducts 7 and 8 may be closed by valves which prevent escape of gas, and duct 10 may be closed by a valve until the pressure in chamber 5 has risen to the desired value and is maintained there by pump 3.

FIG. 2 shows the means of FIG. 1, with heat exchanger 14 receiving the hydrocarbons from duct 4 and delivering them with added heat over duct 15 to input 11 to chamber 5. The additional heat is obtained by heated fluid from an external source delivered over duct 13 to heat exchanger 14, and exhausted over duct 16. This arrangement of FIG. 2 enables iron and slag in chamber 5 to be liquefied.

FIG. 3 shows an arrangement of FIG. 2 which has added source 20 and duct 21 delivering calcium carbonate to reaction chamber 5, where liquefied slag formed by the combination of silica mixed with the iron compounds from source 27 and duct 28, reacted with the calcium carbonate, passes through duct 8 to receptacle 22, and floats as seen at 23 on molten iron as seen at 24. Slag may be drawn off at plug 25 and iron drawn off at plug 26.

FIG. 4 shows the arrangement of FIG. 2 in which iron compounds are delivered over duct 7 to rotating, sloping reaction chamber 33. Heated gas delivered over duct 15 raises the temperature of reaction chamber 33 to a point below the melting point of iron, so that the chemical reaction between the iron compounds and the hydrocarbons produces iron in the solid phase. As this iron has a density substantially greater than the iron compounds, the iron moves by gravity to the bottom of chamber 33 and is delivered over duct 8. The uncombined iron compounds, at a level above a fixed divider 34, pass out of chamber 33 through duct 35 and may be recycled. Gases of the second stream are exhausted from chamber 33 over duct 10.

FIG. 5 shows changes to the arrangement of FIG. 2, in in which the hot exhaust gases in the second stream from duct 10 are divided by stream dividing means 36 into a first portion which passes over duct 37 to be used at an external location by an external heat load, and a second portion which passes over duct 13 to heat exchanger 14, where it heats the hydrocarbons from duct 4, and is exhausted over duct 16.

FIG. 6 shows a source 22 of iron compounds mixed with silica, which are delivered over duct 23 to rotating, sloping separation means 40. The iron compounds have substantially greater density than the silica, and migrate under gravity to the bottom of means 40, from where they may be delivered over duct 7 to reaction chamber 5 in FIGS. 1, 2, 5 and 7. The silica, above the fixed level of shelf 41, is delivered over duct 42 to receptacle 43 for silica.

FIG. 7 shows the arrangement of FIG. 1, with added separation means 48, which separates uncombined hydrocarbons in the second stream delivered over duct 10 from the other gases, delivers the other gases over duct 49, and delivers the separated hydrocarbons over duct 50 to the input 11 of chamber 5 for recycling. Separation means for gases are known in the prior art, such as molecular sieves, or as centrifugal separators which separate gases of different densities by centrifugation, as in uranium isotope separation.

Since many changes could be made in the above method and construction, and many apparently widely different embodiments of this invention could be made, without departing from the scope thereof, it is intended that all matter contained in the above description, or shown in the accompanying drawings, shall be interpreted as being illustrative only, and not limiting.

We claim:

1. The method of producing iron from iron compounds containing oxygen which comprises passing a first stream consisting of heated hydrocarbons, over said iron compounds contained in a reaction chamber, thereby causing at least a portion of said iron to be produced by a chemical reaction between said iron compounds and said hydrocarbons, and causing a second stream of said hydrocarbons which are unreacted and the products of said reaction, to emerge from said reaction chamber, and recycling at least a portion of said second stream over said iron compounds; in which the improvement comprises:

passing said first stream quickly through said reaction chamber, in order to minimize the recombination of oxygen atoms in said products of said reaction with said iron, and passing said second stream through separation means which separates said uncombined hydrocarbons from other gases in said second stream, and delivering only said uncombined hydrocarbons from said separation means to said reaction chamber for recycling, and delivering said other gases from said separation means to an exhaust duct, so that in said reaction chamber said other gases are not present for a material length of time, do not materially dilute said hydrocarbons, and do not materially combine with said iron, and maintaining pressure of said hydrocarbons and said other gases in said reaction chamber above atmospheric pressure, in order to increase the rate of said reaction and to reduce the entrance of air into said reaction chamber, and separating said iron compounds from silica mixed with said iron compounds, so that only said iron compounds enter said reaction chamber.

2. The method of claim 1, in which one of said iron compounds is hematite.

3. The method of claim 1, in which one of said iron compounds is magnetite.

4. The method of claim 1, in which one of said iron compounds is siderite.

5. The method of claim 1, in which one of said iron compounds is limonite.

6. The method of claim 1, in which one of said hydrocarbons is methane.

7. The method of claim 1, in which one of said hydrocarbons is n-butane.

8. The method of claim 1, in which one of said hydrocarbons is isobutane.

9. The method of claim 1, in which said hydrocarbon and said iron compound are selected so that said chemical reaction is exothermic.

10. The method of claim 1, in which said iron compounds are obtained from a deposit of iron ore and are mixed with a material proportion of silica, and said silica is separated from said iron compounds by mechanical means which depend on the different densities of said silica and said iron compounds, before said iron compounds are exposed to said hydrocarbons.

11. The method of claim 1, in which said iron compounds are obtained from a deposit of iron ore and are mixed with a material proportion of silica, and calcium carbonate is added in a proportion material to said proportion of silica, and said first stream of gases has a temperature sufficiently high to cause said silica and said calcium carbonate to combine to form a liquid slag, which is separated from said iron and said iron compounds by gravity, due to the different densities of said iron, said iron compounds and said slag.

12. The method of claim 1, in which said iron compounds and said first stream of gases are heated to a temperature below the melting point of said iron, and said iron produced from said iron compounds is separated from said iron compounds by mechanical means, depending on the different densities of said iron and said iron compounds.

13. The method of claim 1, in which said iron compounds and said first stream of gas are heated to a temperature above the melting point of said iron, and said iron produced in a liquid phase from said iron compounds is separated from said iron compounds by gravity, due to the different densities of said iron and said iron compounds.

14. The method of claim 1, in which said second stream of gases from said reaction chamber passes through heat exchanger means so that at least a portion of the heat in said second stream of gases is delivered to said first stream of gases.

* * * * *